United States Patent Office 3,499,078
Patented Mar. 3, 1970

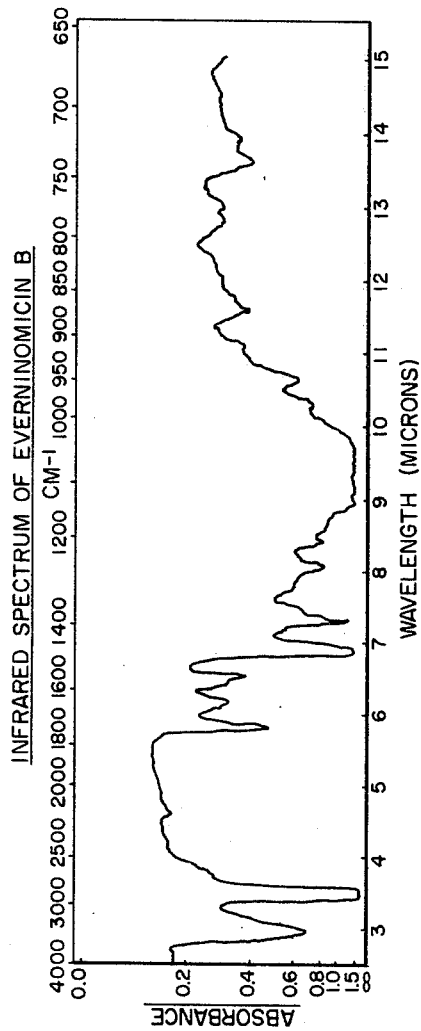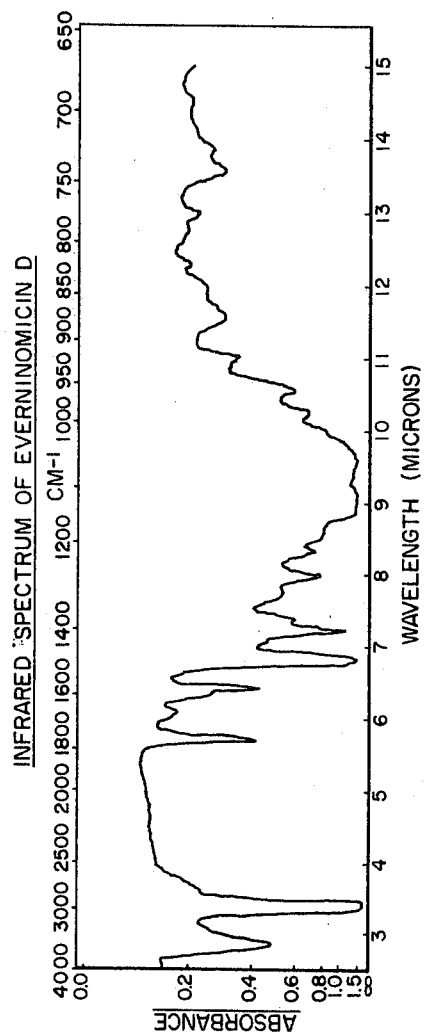

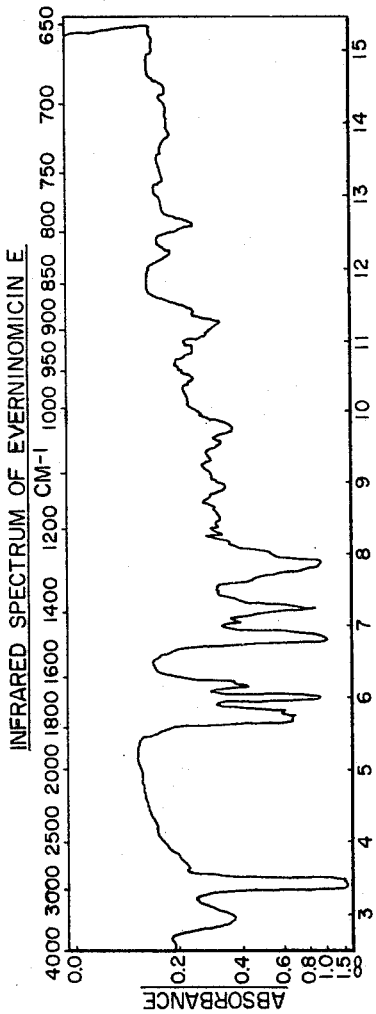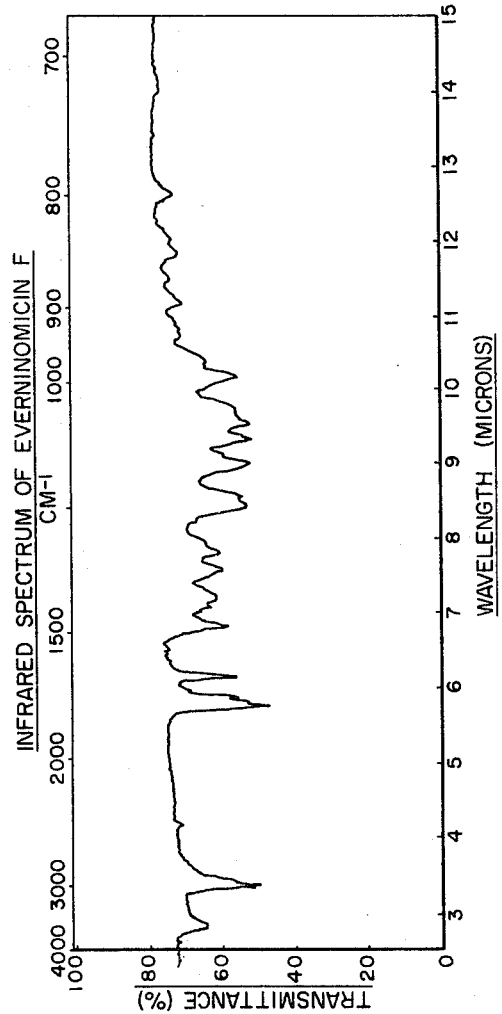

3,499,078
EVERNINOMICIN ANTIBIOTICS AND METHOD FOR THE MANUFACTURE THEREOF
George M. Luedemann, Glen Ridge, and Marvin J. Weinstein, East Brunswick, N.J., assignors to Schering Corporation, Bloomfield, N.J., a corporation of New Jersey
Continuation-in-part of applications Ser. No. 184,484, Apr. 2, 1962, Ser. No. 211,154, July 16, 1962, and Ser. No. 567,811, June 13, 1966. This application Sept. 25, 1968, Ser. No. 762,504
Int. Cl. A61k 21/00; C07g 11/00; C21d 9/00
U.S. Cl. 424—118                                9 Claims

ABSTRACT OF THE DISCLOSURE

Micromonospora carbonacea var. carbonacea and a variant thereof, Micromonospora carbonacea var. aurantiaca, when subjected to submerged aerobic fermentation under controlled conditions produce a mixture of at least six antibiotics; said antibiotics beng designated everninomicin A, everninomicin B, everninomicin C, everninomicin D, everninomicin E and everninomicin F, respectively.

---

This application is a continuation-in-part of prior copending applications Ser. No. 567,811, filed June 13, 1966 (now abandoned); Ser. No. 297,999, filed July 24, 1963 (now abandoned); Ser. No. 211,154, filed July 16, 1962 (now abandoned); and Ser. No. 184,484, filed Apr. 2, 1962 (now abandoned).

This invention relates to compositions of matter which have antibiotic properties and to methods for the manufacture and use thereof.

The novel antibiotics of this invention are formed by cultivation under controlled conditions of hitherto undescribed species of the genus Micromonspora of the order Actinomycetales.

The antibiotics of the instant invention adversely affect the growth of a wide variety of microorganisms such as species of Staphylococcus, Escherichia, Klebsiella, Salmonella and the like. They are useful, therefore, as a bacteriostatic component is wash solutions such as are used to clean surgical equipment, laboratory glassware, military mess halls and the like. Further, the instant antibiotics manifest a broad range of antibacterial properties upon in vivo utilization, as is described hereinbelow.

THE MICROORGANISM

The microorganisms useful for the preparation of the antibiotics of this invention are species of Micromonospora, isolated from a soil sample obtained in Olean, New York, U.S.A. Applicants designate one such organism Micromonospora carbonacea nov. sp. or more accurately Micromonospora carbonacea var. carbonacea to denote its black color. A variable culture of the living organism has been deposited and made part of the stock culture collection of the United States Department of Agriculture, Northern Utilization Research and Development Division, Peoria, Ill. where it was assigned the number NRRL 2972.

The antibiotics of this invention are also produced by a color variant of Micromonospora carbonacea var. carbonacea which was obtained from the same general locale (Olean, N.Y.). The variant is herein designated Micromonospora carbonacea var. aurantiaca thus denoting its orange color. A visible culture of this variant has been deposited and made part of the stock culture collection of the United States Department of Agriculture, Northern Utilization Research and Development Division, Peoria, Ill., where it was assigned the number NRRL 2997. In general, the properties of the two variants are virtually identical except for their difference in color and other minor characteristics described herein. Consequently, where no specific variant is being discussed the variants will be referred to generically as Micromonospora carbonacea or M. carbonacea.

M. carbonacea var. carbonacea is characterized by the development of coal-black areas of spore accumulation on an otherwise orange vegetative mycelial colony when grown on 0.5% yeast extract, 1% dextrose, 0.1% $CaCO_3$, 1.5% agar and incubated for 20 days at 28° C. The spores of M. carbonacea var. carbonacea tend to be oblong ellipsoidal and the average dimension of the mature spore is 1.0 by $1.5\mu$. The fully mature spores when microscopically viewed by transmitted light are dark in color. Sporophores appear in large concentrations in particular areas of the vegetative mycelium rather than randomly throughout the entire mycelial length. The vegetative mycelium does not normally appear to break up into polymorphic elements (fragments) but retains its integrity until eventual autolysis. The vegetative mycelium averages $0.6\mu$ in diameter, is non-acid fast, and gram-positive. The organism digests certain types of protein and starch, is aerobic, and grows well between 16–37° C. but not at 50° C. or above. While the colony form and orange color (with brownish-black mottling) are typical of the fresh soil isolate, the characteristics may be temporarily or permanently lost in strains obtained by repeated isolation and transfer.

Coloney observations were made on M. carbonacea var. carbonacea after 14 days incubation at 24–26° C. in the designated media. In describing the color formations (Table I) the following system and references are employed: The color designation consists of two designates. The first is a color name taken from the "Descriptive Color Name Dictionary," by Taylor, Knoche and Granville, published by the Container Corporation of America, 1950 (U.S.A.), with a color chip number corresponding to the color name; said chip number taken from the "Color Harmony Manual," 4th edition, 1958, published by the Container Corporation of America, U.S.A. The second designate, consists of a color-name and number which refers to the synonym or near synonym found in the National Bureau of Standards, Circular 553, November 1, 1955 (U.S.A.).

TABLE I.—COLONY COLOR CHARACTERISTICS OF M. Carbonacea var. Carbonacea

| Medium | Colony Observations | |
|---|---|---|
| | Macroscopic | Microscopic |
| 0.1% NZ amine Type A, [1] 1% dextrose, 1.5% agar | No aerial mycelium; colony flat, moist; growth fair; no diffusible pigment produced; surface: (periphery) brite orange-g4NA; vivid orange-48 (center) brownish-black; reverse: id. | Mycelium long, branched, regular, nonseptate, $0.6\mu$ in diameter. Spores abundant, oblong to ellipsoidal, 1.0 x $1.5\mu$, dark in color, borne on clusters of sporophores. |
| 3% NZ amine Type A, 1% dextrose, 1.5% agar | No aerial mycelium; colony raised, ridged; growth good; no diffusible pigment produced; surface: terra cotta-g5PE; strong brown-55; reverse: id. | Mycelium long, branched, regular, nonseptate, $0.6\mu$ in diameter. Spores oblong to ellipsoidal 1.0 x $1.5\mu$, dark in color, borne singly on single sporophores. |

[1] Sheffield Chemical Company, Norwich, New York.

Although the invention as set forth herein describes the use of the M. carbonacea var. carbonacea to produce certain antibiotics described herein, it is to be understood that the process aspect of the invention is not so limited but includes the hereinabove mentioned color variant. It also includes mutants and variants produced from the described organisms by mutating agents such as high frequency radiation (X-ray, ultraviolet), actinophages and nitrogen mustards.

To isolate the microorganism, a portion of the soil sample is shaken in sterile distilled water and after making suitable dilutions, the suspension is plated on screen agar medium comprising 0.5% tryptose, 2.0% soluble starch, 0.3% calcium propionate, 2.0% agar all in distilled water.

The cultures are tested for antibiotic activity by first growing for up to 60 days at 26° C. in a medium comprising 0.3% beef extract, 0.5% tryptose, 0.1% dextrose, 2.4% soluble starch, 0.5% yeast extract, 1.5% agar, all in tap water. The whole aqueous agar is then extracted with butanol and the butanol-water extract is concentrated. Sufficient antibiotic is extracted by the butanol-water mixture to provide a concentrate which, by standard disc test inhibits the growth of *Staphylococcus aureus* and *Bacillus subtilis*. Antibiotic activity against the same organisms is observed after growth in submerged fermentation for 96 hours in aqueous medium such as one containing 0.5% yeast extract, 0.1% fish solubles, 0.1% calcium carbonate, 0.1% spray dried corn steep liquor, 3.0% lactose.

Colonies incubated for 14 days at 26° C. on various media displayed the following growth and colony characteristics: it grows poorly on glucose-asparagine agar, liquifies gelatin, slowly digests milk, utilizes sucrose, hydrolyzes starch, reduces nitrates to nitrites, exhibits good growth at 16–37° C. but no growth at 50° C. and is aerobic in its requirements.

Growth and colony characteristics have been observed in media commonly employed for Streptomyces determinations. The growth characteristics on such media are as follows: Potato slice—fair, carrot slice—poor, Czapek's agar—none, tyrosine agar (observations made at 2, 7 and 14 days)—fair with no diffusible pigments, peptone-iron agar (observations at 2, 7 and 14 days)—fair with no color reaction, bromocresol purple milk—fair with partial digestion. In Table II there is presented the growth and colony color characteristics observed on various media. The color system employed is the same as that in Table I.

gen source, all in distilled water. With asparagine or glutamic acid, growth is poor while no growth is observed in media containing ammonium or sodium nitrate. With 1% NZ Amine Type A growth is fair with the colony raised and ridged. The colony color is russet orange–g4PC; deep orange–51 (with slight brownish-black mottling). When the nitrogen source is 0.5% Difco yeast extract, growth is fair, the colony is raised and ridged with peripheral color being orange–g5LA; strong orange–50 and center color being mottled brownish-black.

*M. carbonacea* var. *aurantiaca* is taxonomically similar to *M. carbonacea* var. *carbonacea* with the following exceptions: This variant fails to reduce nitrate, occasionally produces a yellow diffusible pigment when grown in a carbohydrate medium of mannose or xylose, and exhibits a limited product of spores. The colony color on most agar media is orange turning orange-brown on aging. Occasionally, small black areas, consisting almost entirely of dark colored spores appear on the orange surface. The orange areas are composed mainly of vegetative mycelium. On Bennett's agar, growth of the variant is good, raised, with colony color being burnt-orange–g5NC; strong reddish orange–35. On tomato paste, oatmeal agar (containing 0.1% sodium carbonate) growth is fair and raised with colony color being bittersweet–g5PC; deep orange–51.

THE ANTIBIOTIC

*M. carbonacea* by the fermentation methods described herein, produces antibiotic compositions of matter. After the fermentation, when the mycelium is separated from the broth, the antibiotic substances are found primarily in the broth and are separated therefrom by the methods described herein. By paper chromatographic studies, it appears that there are a number of different antibiotic substances produced, six of which are hereinafter identified as everninomicin A, B, C, D, E and F respectively (formerly R–451A, B, C, D, E and F respectively), the resolution of which is dependent upon the method of partition chromatography employed.

Degradation studies on the antibiotics of this invention show that at least three members of the group (everninomicin B, D and F) contain dichloroisoeverninic acid as an integral part of its molecular structure. Consequently, the group was collectively named everninomicin. The three above-named members of the group appear to contain the principal antibiotic properties, therefore, it is within them TABLE II.—GROWTH AND COLOR CHARACTERISTICS OF *M. CARBONACEA* var. *CARBONACEA*

| Medium plus 0.1% CaCO₃ | Observed growth and colony color. |
| --- | --- |
| Bennett's Agar | Growth good, raised and ridged. Colony color: bright orange-g5NA; vivid orange-48 (mottled brownish-black). |
| Emerson's Agar | Growth fair, raised. Colony color: terra cotta-g5PE; strong brown-55. |
| Tomato Paste-Oatmeal Agar | Growth good, ridged. Colony color: periphery: orange-g5LA; strong orange-50 center: brownish-black. |
| Glucose Yeast Extract Agar | Growth fair, ridged. Colony color: russet orange-g4NC; deep orange-51. |

*M. carbonacea* is capable of utilizing various carbon and nitrogen sources. For determination of carbon utilization a visual estimate is made of its growth on agar plates in media consisting of 0.5% yeast extract, Difco (Difco Laboratories, Inc., Detroit, Mich.), 1.5% agar and 1% of the test carbohydrate all in distilled water. Observable growth is good in media containing the following carbohydrate component: arabinose, glucose, galactose, lactose, levulose, mannose, starch, sucrose, or xylose but poor in media containing one of the following: raffinose, rhamnose, inositol, mannitol or sorbitol. (Poor growth is observed in a control medium containing only 0.5% yeast extract.)

Nitrogen utilization is similarly determined by visual estimate of growth on agar plates in a medium consisting of 1% glucose, 1.5% agar and 1% of the particular nitrothat this invention is primarily but not exclusively concerned.

In order to form the antibiotic substances, *M. carbonacea* is grown at a suitable temperature of 25° C. to 40° C., under submerged aerobic conditions in an aqueous nutrient medium containing an assimilable carbon and nitrogen source. Suitable nitrogen sources include both organic and inorganic nitrogen, preferably the former, such as soybean meal, peptones and the like. Suitable carbon sources include carbohydrates such as starch, dextrin, sugars and the like.

The fermentation is carried out for about 60 to 72 hours at a pH of about 6 to 8. At about the end of this period, peak antibiotic production has been attained. Since most of the activity resides in the broth, the mycelium is removed by filtration and discarded. The antibiotic substances are separated from the broth by solvent extraction with an immiscible organic solvent. In general, such solvents as the chlorinated alkanes, ethers, esters, aromatic hydrocarbons and the like may be used. Exemplary of the foregoing are such solvents as methylene chloride, chloroform, ethyl ether, dibutyl ether, ethyl acetate, butyl acetate, benzene, toluene and the like.

Resolution into components is effected by partition chromatography, essentially as described herein. The antibiotic substances are first isolated from the broth-extraction solvent by evaporation of the solvent to a residue. The residue is examined paper chromatographically which serves as a guide for partition chromatography (Table III). The paper chromatograms are run in different solvent system and $R_f$ values for the components are determined bioautigraphically. Bioautography utilizes the method of developing and drying a paper chromatogram which then is overlaid on an agar plate seeded with S. aureus. After a contact time of 15 minutes, the paper is removed from the plate which is then incubated at 37° C. for 16–20 hours. Observations of the location of inhibition zones permits determination of $R_f$ values of the antibiotically active components.

In the following Table III are shown the various solvent systems employed and the $R_f$ values or $R_t$ values determined for the components. In each system, descending solvent was employed:

TABLE III.—CHROMATOGRAPHIC STUDIES ON ANTIBIOTIC SUBSTANCES PRODUCED BY FERMENTATION

| Solvent System | Everninomicin | | | | | |
|---|---|---|---|---|---|---|
| | $R_f$ Value | | | | | |
| I. | A | B | C | D | E | F |
| Benzene, 10 pts. Petroleum ether (30–60° C.), 2.5 pts. Acetone, 5 pts. Developing time, 1½ hrs. | 0 | 0.14 | 0.28 | 0.64 | 0.74 | 0.74 |
| II. | | | | | | |
| Toluene, 20 pts. n-Butanol, 1.5 pts. Distilled water, 7.0 pts. Petroleum ether (30–60° C.), 1.5 pts. Developing time, 4½ hrs. | 0 | 0.19 | 0.42 | 0.61 | 0.71 | 0.71 |
| III. | | | | | | |
| Petroleum ether (60–90° C.), 5 pts. Methanol, 8 pts. Ethyl acetate, 5 pts. Distilled water, 2 pts. Developing time, 2 hrs. | 0 | 0.08 | 0.26 | 0.60 | 0.82 | 0.82 |
| IV. | $R_t$ Value | | | | | |
| Ligroin (90–120° C.), 3 pts. Butyl acetate, 7 pts. | | 0.11 | | 0.36 | 0.16 | 0.77 |

The above solvent mixture is saturated with a 15% aqueous solution of 4-chloro-2-methylphenoxyacetic acid sodium salt.

In the examples which follow are illustrated suitable methods for fermenting *M. carbonacea*, extracting the antibiotic substances and resolving the antibiotic substances into components. The procedures associated with the tank fermentation and work-up utilize a diatomaceous earth column chromatography which effectively resolves the antibiotic substances and allows for the separation and isolation of everinonomicin components B, D and E.

In some of the examples which follow, an assay value of the produced antibiotic is expressed in terms of units per milligram as an indication of activity. The assay is effected microbiologically by a standard cup-type agar diffusion assay technique using *S. aureus* (A.T.C.C. 6538P) as tests organism. A reference curve is prepared by plotting the dosage-response of the antibiotic diluted in phosphate buffer at pH 8 in a medium consisting of:

| | Percent |
|---|---|
| Peptone | 0.6 |
| Pancreatic digest of casein | 0.4 |
| Yeast extract | 0.3 |
| Beef extract | 0.15 |
| Dextrose | 0.15 |
| Agar | 1.5 | pH, 6.6

A suspension of the assay organism (*S. aureus* A.T.C.C. 6538P) is standardized to provide 20% transmission at 660 mμ in a colorimeter. The potency of the sample is determined from the reference curve and expressed in terms of units per milligram (a unit being that amount of test substance required to produce a 15 mm. zone of inhibition with a steel cylinder of 6.5 mm. outside diameter.).

The organism *M. carbonacea* is mentioned herein as the producer of the herein described antibiotics. It is to be understood, however, that this is done merely for clarity in reading and understanding the specification. It is thus to be understood that in the foregoing discussion and in the examples which follow, it is intended to indicate that where *M. carbonacea* is mentioned as the antibiotic producing microorganism that its variant, *M. carbonacea* var. *aurantiaca* and other equivalent organisms, may be equally utilized to yield essentially the same result.

EAMPLE 1

Tank fermentation of *M. carbonacea*

*Germination stage.*—Aseptically add a lyophilized culture of *M. carbonacea* to a 300 ml. shake flask containing 100 ml. of the following sterile growth medium:

| | | |
|---|---|---|
| Bacto-beef extract | gm | 3 |
| Tryptose | gm | 5 |
| Dextrose | gm | 1 |
| Starch (soluble) | gm | 24 |
| Yeast extract | gm | 5 |
| Calcium carbonate | gm | 1 |
| Tap water | ml | 1000 |

Incubate the flask and its contents for 4 days at 35° C. (or until good germination is obtained) on a rotary shaker (280 r.p.m., 2 inch stroke).

*Pre-seeding stage.*—To each of three 300 ml. shake flasks containing 100 ml. of the aforementioned sterile growth medium, add 5 ml. of the inoculum from the germination stage. Incubate the flasks and their contents for 72 hours at 30° C. on the rotary shaker.

*Inoculum preparation stage.*—Transfer 25 ml. inoculums (from the pre-seeding stage flasks) to each of ten 2-liter flasks, each containing 500 ml. of the sterile growth medium utilized for germination. Incubate the flasks and contents for 72 hours at 30° C. on a rotary shaker (280 r.p.m., 2″ stroke). Pool the contents of the flasks and aseptically transfer the broth into a sterilie inoculum flask having a side arm (total volume—about 5 liters).

*Fermentation stage.*—Aseptically transfer the 5-liters of inoculum to a 35 gallon fermenter containing 90 liters of the sterile growth medium employed in the germination stage. Acrobically ferment for 20–30 hours (until the packed coil volume (PCV) is about 20–30%—as determined by centrifuging a 10 ml. sample at 2800 r.p.m. for 5 minutes) under the following conditions:

| | | |
|---|---|---|
| Temperature | °C | 35 |
| Sterile air input | cubic feet/minute | 5.4 |
| Pressure | p.s.i | 7 |
| Agitation | r.p.m | 180 |

When the PCV reaches a level of at least 2 ml., aseptically transfer the contents of the fermenter to a 675 gallon formentation tank containing 450 gallons of sterile medium having the following composition:

| | | |
|---|---|---|
| Yeast extract | kg | 8.5 |
| Fish solubles | kg | 1.7 |
| Corn steep liquor (dry) | kg | 1.7 |
| Calcium carbonate | kg | 1.7 |
| Lactose | kg | 51.0 |
| Anti-foam (GE–60) | ml | 500 |
| Soft water | gallons | 450 |

Ferment at 35° C. while agitating at 120 r.p.m. and introducing air at 7 p.s.i. in. and 15 cu. ft./min. for 50–70 hours.

At the end of this period, the potency of the produced antibiotic reaches a peak which remains substantially constant as determined by sampling and assay against *S. aureus*.

During the fermentation the pH remains substantially in the range of 7.0–7.3. The packed cell volume reaches a constant value of about 2.0 ml.

EXAMPLE 2

Laboratory fermentation of *M. Carbonacea*

*Germination stage*.—Perform the germination stage as described in Example 1 (the calcium carbonate may be omitted).

*Fermentation stage*.—Transfer a 25 ml. inoculum from the germination stage to each of four 2-liters flasks each containing 500 ml. of the following medium:

| | | |
|---|---|---|
| Yeast | gm | 5 |
| Fish solubles | gm | 1 |
| Corn steep liquor (dry) | gm | 1 |
| Calcium carbonate | gm | 1 |
| Lactose | gm | 30 |
| Tap water | ml | 1000 |

Incubate the flasks and their contents for 2–3 days at 26° C. on a rotary shaker. Pool the contents of the flasks. Work up as described in the following examples making appropriate adjustments as to quantities and volumes.

EXAMPLE 3

Extraction of the antibiotics after tank fermentation

Add 25 kg. of filter-aid (Celite) to the 500 gal. of fermentation broth from Example 1, agitate, and filter. Discard the mycelial cake. Extract the filtrate twice with an equal volume of toluene. Combine the toluene extracts and concentrate in vacuo to dryness (oily dark brown residue). Suspend the residue in 1000 ml. of chloroform, filter and add the chloroform solution under vigorous agitation to ten volumes of petroleum ether. Continue stirring for five minutes. Separate the semi-solid oily precipitate from the supernatant liquid by decantation. Redissolve the precipitate in 600 ml. chloroform and add the solution to five volumes of petroleum ether while stirring vigorously. Filter the mixture, wash the amorphous precipitate comprising antibiotic substances with petroleum ether and air dry. Yield: 12.6 g. (Minimum inhibitory concentration against *S. aureus*: 1–5 µg./ml.)

EXAMPLE 4

Separation of the antibiotics

Separation of the antibiotic substances obtained in Example 3 is effected by partition chromatography utilizing a two-phase solvent system and a purified diatomaceous earth (Chromosorb W, Johns Manville and Company, U.S.A., non-acid washed, mesh size 60–100) as the inert support for the heavier phase as follows:

Prepare a two-phase solvent system having the following composition:

| | Parts |
|---|---|
| Petroleum ether (60–90° C.) | 25 |
| Ethyl acetate | 75 |
| Methyl alcohol | 70 |
| Distiled water | 30 |

Equilibrate 1.9 kg. of the inert support with 950 ml. of the heavier phase of the above two-phase solvent mixture and pour the mixture slowly into a 9 cm. diameter glass column provided with a fritted disc at its bottom, said column previously filled to three quarters of its length with the lighter phase. Allow the diatomaceous earth to settle in the column to a compact bed and then further compress under a nitrogen pressure of 1 to 2 lbs./sq. inch. (The height of the column thus prepared is 137 cm.)

Dissolve 7.0 g. of the amorphous matter from Example 3 in 38 ml. of the heavier phase of the two phase solvent system. Add 19 g. of the diatomaceous earth and add the solid mixture to the top of the column bed and firmly compress. Elute with the lighter phase of the two-phase solvent system. Collect eluates at a rate of 50 ml./min. The number of individual fractions is optional but related to the column hold-up volume (HUV); HUV being defined as the intersticial volume occupied by the lighter phase of the two-phase system in the total bed volume of the column. In this column, the HUV is about 3500 ml. Discard the first hold-up volume collected. Thereafter, chromatograph a sample of each collected fraction on paper using solvent system I, described previously, and bioautograph the developed and dried papergram against *S. aureus*. Combine fractions according to their paperchromatographic pattern. Concentrate the combined fractions to dryness in vacuo, weigh, and against paperchromatograph and bioautograph to determine the relative composition of the particular fraction combination.

By the column chromatographic separation described above, the following results are obtained:

TABLE IV

Chromatography in Diatomaceous Earth

| HUV | Eluant, ml. | Weight of residue, mg. | Paper bioautographic pattern, Rf |
|---|---|---|---|
| 1 | 3,500 | | |
| 2 | 3,500 | 4,300 | 0.77 |
| 2.1–2.9 | 2,800 | 190 | 0.79 |
| 3–10 | 24,500 | 2,200 | 0.3; 0.65; 0.75 |
| 11–13 | 7,000 | 100 | 0.14; 0.28; 0.64 |
| 14–16 | 7,000 | 100 | 0 |

Chromatograph one gram of the material obtained from HUV 3–10 utilizing the inert support (Chromosorb W) for the heavier phase of the following two-phase solvent system:

| | Parts |
|---|---|
| Petroleum ether (B.P. 30–60° C.) | 10 |
| Toleuene | 200 |
| n-Butyl alcohol | 15 |
| Ethyl alcohol | 15 |
| Distiled water | 70 |

Equilibrate 600 g. of the diatomaceous earth support with 300 ml. of the heavier phase of the above two phase solvent mixture and slowly pour into a 5 cm. diam. glass column partly filled with the lighter phase of the above two-phase solvent system. Permit the support to settle by gravity to a compact bed and further compress by a nitrogen pressure of 1–2 lbs./sq. inch. The height of the column thus prepared is 107 cm. and its hold-up volume is 900 ml. Dissolve the material to be chromatographed in 10 ml. of the heavier phase of the above two phase solvent system, add 5 g. of the inert support and mix. Add the solid mixture to the top of the column bed and firmly press down. Perform elution with the lighter phase of the above two phase solvent system at a flow rate of 100 ml./min. Continuously collect fractions of 50–900 ml. (corresponding to one-eighteenth to one times the hold-up volume of the column bed). Discard the first hold-up volume obtained immediately after applying the test material; start collection with the second hold-up volume.

Immediately chromatograph a sample of each collected fraction on paper using solvent system I described above and bioautograph the developed and dried papergram against *S. aureus*. (System I is preferred since it is the most rapid). Combine fractions according to their paper chromatography pattern, and concentrate the pooled fractions to dryness in vacuo. Weigh the residue and rechromatograph on paper followed by bioautography for confirmation of composition. The result of the column chromatographic separation thus processed is given in the following table:

TABLE V

| HUV | Chromatography of HUV 3–10 | | |
|---|---|---|---|
| | Eluant, ml. | Weight of residue, mg. | Paper bioautographic Pattern, $R_F$ |
| 1 | 900 | | |
| 1–1.5 | 450 | 320 | 0.78 |
| 1.5–14 | 11,000 | 680 | 0.64; 0.74 |

EXAMPLE 5

Purification of everninomicin D component

Suspend 100 mg. of the residue obtained from HUV 1.5–14 in the previous example in 40 ml. of ether by stirring vigorously at room temperature. Filter and chill the filtrate overnight. Filter the precipitate which forms and wash with ice cold ether. Air dry obtaining about 81 mg. of a nearly colorless powder, assaying at 1155 units/mg., M.P. 138–140° C. Further purify by dissolving in a minimal quantity of hot isopropyl alcohol, add decolorizing charcoal (amount equal to 10% of everninomicin D), filter and cool the filtrate in an ice bath. Filter the precipitate, wash with cold isopropyl alcohol and dry in high vacuum at room temperature. Everninomicin D so prepared assays at 1450 units/mg.

The purified everninomicin D obtained above is biologically homogeneous when assayed qualitatively against *S. aureus*. When the everninomicin D is chromatographed on a thin layer of silica gel (Stahl technique) using acetone-benzene (1:1) as the eluting agent followed by sulfuric acid treatment of the developed, dried plate, so other substance but the D component is detectable.

EXAMPLE 6

Acetylation of everninomicin D

Dissolve 25 mg. everninomicin D in 1 ml. of pyridine. Add 0.4 ml. acetic anhydride and allow the mixture to stand overnight. Filter the precipitate, wash with water to remove pyridine and acetic acid, dry over phosphorous pentoxide in high vacuum overnight. Yield: 11 mg. colorless amorphous powder, M.P. 135–136° C. Isolate a second crop of material from the mother liquor of the above precipitate by cooling the solution overnight in a refrigeratr (5° C.), filtering the precipitate, washing it free from any pyridine and acetic anhydride and drying it as above. Yield: 6 mg. of a colorless amorphous powder. Purify by dissolving the crude acetylation product in methylene chloride and adding thereto decolorizing charcoal. Filter and add hexane to the clear filtrate. Filter the precipitate and air dry.

When chromatographed on thin layer, using a silica gel, (Silica Gel G.E. Merck A.G., Darmstadt, Germany) as adsorbent and acetone:benzene (1:1) as eluting system and upon spraying of the developed and dried plate with sulfuric acid there is obtained a single component of $R_F$ value 0.87. (Under these conditions the D component has an $R_f$ value of 0.49). Upon alkaline hydrolysis in methanol, everninomicin D is regenerated.

EXAMPLE 7

Methyl ether of everninomicin D

Dissolve 500 mg. everninomicin D in 11 ml. of ethyl acetate and 11 ml. of ethyl ether. Add an excess of an ethereal solution of diazomethane and let the yellow solution stand at 5° C. for 72 hours. Evaporate the solution to dryness under a stream of nitrogen. Dissolve the crude product in 5 ml. of isopropyl alcohol, refrigerate and collect the precipitate by filtration. Wash with cold isopropyl alcohol and dry obtaining 260 mg. of the methyl ether as colorless prisms, M.P. 161–162° C.; $[\alpha]_D^{25} = -17.7°$ (1% in pyridine); $\lambda_{max}$ 288 m$\mu$ ($\epsilon^{1\%} = 13.7$).

EXAMPLE 8

Purification of everninomicin E

This non-polar component of the antibiotic mixture is usually found in high concentration in the supernatant liquor of the chloroform-petroleum ether precipitation of the crude fermentation extract described in Example 3. It also is present, to a lesser extent, in the precipitated antibiotic substances and is recoverable therefrom by utilizing the column partition chromatography method described in Example 4.

In order to obtain everninomicin E, concentrate HUV 1–1.5, from Example 4, to dryness in vacuo and air dry. There is obtained about 320 mg. of an amber-colored material which is further purified by precipitation from ether-hexane yielding 280 mg. of a nearly colorless amorphous powder representing purified E component.

Upon paper chromatography in System I and bioautography against *S. aureus* and *B. subtilis*, Everninomicin E is characterized as being biologically homogeneous.

EXAMPLE 9

Isolation of everninomicin B

Isolation of the B component is effected by similar partition chromatography as described in Example 4 by utilizing a two-phase solvent system and a purified diatomaceous earth (chromosorb W. Johns Manville and Company, USA, non-acid washed, mesh size 60–100) as the inert support for the heavier phase as follows:

Prepare the two-phase system (petroleum ether, ethylacetate, methanol, water) described in Example 4.

Equilibrate 2.5 kg. of the invert support with 1250 ml. of the heavier phase of the two-phase solvent mixture and prepare the column bed as described in Example 4.

Dissolve 7.4 g. of the amorphous precipitate from Example 3 in 40 ml. of the heavier phase of the two-phase solvent system. Add 20 g. of the diatomaceous earth and add the solid mixture to the top of the column bed and firmly compress. Elute with the lighter phase of the two-phase solvent system. The HUV of this column is about 8000 ml.

By following the column chromatogrphic separation procedure of Example 4 the following results are obtained:

TABLE VI.—RESOLUTION OF ANITBIOTIC SUBSTANCES BY CHROMATOGRAPHY ON DIATOMACEOUS EARTH

| HUV | Eluant, ml. | Weight of residue, mg. | Paper bioautographic pattern, $R_f$ |
|---|---|---|---|
| 0.9 | 7,000 | | |
| 1–1.1 | 800 | 186 | 0.8; 0.55 |
| 1.2–1.8 | 5,000 | 900 | 0.56; 0.43 |
| 1.9–2.8 | 7,200 | 5,700 | 0.16; 0.23; 0.43; 0.55 |
| 2.9–3.9 | ¹ 8,000 | 100 | 0; 0.16; 0.23; 0 55 (trace) |
| 4.0–5.0 | ² 8,000 | 120 | 0 |

¹ Acetone elution.
² 50% acetone in methanol elution.

Chromatograph 1.8 gram of the material obtained from HUV 1.9–2.8 on 1800 grams cellulose powder (Whatman, non-acid washed; fine grade) packed into a column of 7.5 cm. diameter to a height of 150 cm. by using the following one phase solvent mixture.

| | Parts |
|---|---|
| Acetone | 1 |
| Petroleum ether (B.P. 30–60° C.) | 25 |
| Benzene | 50 |

Dissolve the material to be chromatographed in 68 ml. of the solvent mixture, admix 50 g. cellulose and charge the mixture to the top of the column bed. Perform elution at a flow rate of 50 ml./min. Continuously collect fractions of 100 ml. The HUV of this column is about 6000 ml. Combine eluates as shown in the following table.

TABLE VII.—CHROMATOGRAPHY OF HUV 1.9–2.8 FROM TABLE VI

| HUV | Eluant, ml. | Weight of residue; mg. | Paper bioautographic pattern; $R_f$ |
|---|---|---|---|
| 0.7 | 4,200 | | |
| 0.8–1.6 | 4,800 | 1,100 | 0.55 |
| 1.7–17.6 | 96,000 | 300 | 0.43 |
| 17.7–27.7 | 60,000 | 200 | 0.16; 0.23 |
| 27.7–28.1 | 2,400 | 70 | 0; 0.15 |

Alternatively, everninomicin B is separated from everninomicin D and E by chromatography on Florisil (activated magnesium silicate, Floridin Company Tallahassee, Fla.) as follows:

Prepare a bed of 22.5″ height and 1.75″ diam. by pouring a methylene chloride slurry of 500 grams of Florisil 60–100 mesh, activated for 18 hours at 105° C., into a glass column. The hold-up volume of the bed is 1100 ml. Dissolve 50 g. of crude antibiotic amorphous precipitate (obtained in Example 3) in 300 ml. of methylene chloride and add the clear solution to the Florisil column. Elute by passing four hold-up volumes of methylene chloride, followed by eight hold-up volumes of methylene chloride containing 5% acetone, eight hold-up volumes of methylene chloride containing 10% acetone, 8 hold-up volumes of methylene chloride containing 20% acetone, 8 hold-up volumes of methylene chloride containing 50% acetone, and finally 16 hold-up volumes of pure acetone.

The results of such a procedure are set forth in the following table:

TABLE VIII.—FLORISIL CHROMATOGRAPHY OF CRUDE ANTIBIOTICS

| Eluant | Eluate, ml. | Weight of residue, g. | Paper biautographic pattern; $R_f$ |
|---|---|---|---|
| $CH_2Cl_2$ | 4,400 | 10.2 | 0.43(D); 0.56(E) |
| $CH_2Cl_2$ plus 5% acetone | 8,800 | 8.1 | 0.45(D) |
| $CH_2Cl_2$ plus 10% acetone | 8,800 | 13.2 | 0.43(D) |
| $CH_2Cl_2$ plus 20% acetone | 8,800 | 2.3 | 0.45(D); 0.24(B) |
| $CH_2Cl_2$ plus 50% acetone | 8,800 | 6.3 | 0.23(B) |
| 100% acetone | 8,800 | 5.4 | 0.15(?); 0.23(B) |

In the foregoing table, the latter designate in the right-hand column denotes the particular everninomicin component present in the particular eluate.

EXAMPLE 10

Purification of everninomicin B

Dissolve 200 mg. of the residue obtained from HUV 17.7–27.7 obtained from cellulose column of Example 9 in 5 ml. of acetone. With vigorous agitation add the acetone solution to 50 ml. of hexane. Filter the precipitate which forms and wash with hexane. Dry at room temperature in vacuo over phosphorus pentoxide obtaining about 120 mg. of an off-white powder.

Further purification of component B from either technique of isolation is achieved by dissolving the amorphous powder in hot isopropyl alcohol, adding 10% by weight decolorizing charcoal, stirring for 10 minutes, filtering and cooling the filtrate to 5° C. The precipitate is collected by filtration, washed with cold isopropyl alcohol, and dried in high vacuum at room temperature for 24 hours. It assays at 760 units/mg.

The filtrate s from the above purification are combined and employed in Example 11 below for the isolation and purificaton of everninomicin F.

EXAMPLE 11

Isolation and purification of everninomicin F

Evaporate to dryness in vacuo the combined filtrates from Example 10. Dissolve the residue (422 mg.) in acetone (7 ml.) and filter off insolubles. Add the acetone solution to 70 ml. of ether-hexane mixture (10 to 4 v./v.) with vigorous stirring. Filter the precipitate formed. Evaporate the filtrate in vacuo to small volume (approximately 20 ml.) and separate the percipitate formed by filtration. Evaporate the filtrate in vacuo to dryness to obtain purified component F as an off-white powder.

CHEMICAL AND PHYSICAL PROPERTIES

Everninomicin B

Everninomicin B, as produced by the method of Examples 9 and 10 is a colorless substance having the following properties:

(I) Melting point: (Koeffler block): 154–157° C.
(II) Optical rotation: $[\alpha]_D^{25} = -25.5$ (c.=1% in pyridine).
(III) Ultraviolet absorption: $\lambda_{max}$ 288 m$\mu$ ($\epsilon^{1\%}=12$, in methanol). $\lambda_{max}$ 296 m$\mu$ ($\epsilon^{1\%}=72$, in 0.1 N methanolic NaOH).
(IV) Analysis:
  (a) Elemental:
    C=51.02%
    H=6.68%
    N=1.23%
    O=34.72%
    Cl=3.97%
  (b) Functional groups:
    $OCH_3$=12.80%
    (C)$CH_3$=7.15%
    (N)$CH_3$=2.33%

(V) Infrared spectrum: (See FIGURE 1 for spectrum in mineral oil—Nujol.) The absorption peaks are located at the following wavelengths (with peak strength codified as follows: W=weak, M=moderate, M–S= moderate to strong, S=strong, VS=very strong, sh= shoulder):

| $\lambda_{max}$ ($\mu$): | Park strength |
|---|---|
| 2.88 | S |
| 3.65 | W |
| 4.54 | W |
| 4.65 | W |
| 5.74 | S |
| 5.82 | sh |
| 6.02 | sh |
| 6.10 | M |
| 6.35–6.39 | m (doublet) |
| 6.45 | S |
| 7.30 | sh |
| 7.40 | sh |
| 7.67–7.80 | sh |
| 7.92 | sh |
| 7.98 | S |
| 8.12 | sh |
| 8.30–8.35 | S (broad) |
| 8.55 | sh |
| 8.75–9.80 | S (broad) |
| 10.20–10.26 | S (broad) |
| 10.30 | sh |
| 10.33 | sh |
| 10.61 | S |

| $\lambda_{max.}(\mu)$: | Peak strength |
|---|---|
| 10.85 | sh |
| 11.03 | M |
| 11.52 | M |
| 11.70 | sh |
| 11.85–12.00 | sh |
| 12.75–12.81 | W (broad) |
| 12.98 | W |
| 13.54–13.60 | M (broad) |
| 13.85–13.90 | M (broad) |

(VI) Solubility: Soluble in chlorinated hydrocarbons (methylene chloride, chloroform), alcohol, acetone, pyridine and dilute alkali. Slightly soluble in benzene; insoluble in ether, hexane and water.

Everninomicin D

The antibiotic, as produced herein, is a white amorphous powder having the following physical and chemical characteristics:

(I) Melting point: (Koeffler block): 138–140° C., from ether trituration; after recrystallization from isopropanol, M.P.=160–161° C.

(II) Analysis:
  (a) Quantitative:
    C=51.79%
    H=6.35%
    N=1.40%
    O=36.35%
    Cl=3.98%
    $OCH_3$=13.30%
    $C(CH_3)$=6.93%
    $N(CH_3)$=1.98%
  (b) Qualitative:
    (1) Ninhydrin test—negative
    (2) Elson-Morgan test—positive
    (3) Alkaline $KM_nO_4$ test—positive
    (4) Anthrone test—grayish blue
    (5) 2,4-dinitrophenylhydrazine test: positive
    (6) Ehrlich (diphenylamine test): negative
    (7) Triphenyltetrazolium test: weakly positive (III) Rotation: $[\alpha]_D^{25}$=−25.3° (1% in methanol), −37.7° (1% in pyridine).

(IV) Ultraviolet spectrum: $\lambda_{max}$ at 289 m$\mu$ ($\epsilon^{1\%}$=22). (In a solution of 6 ml. of 1.0 N potassium hydroxide in 100 ml. of methanol, $\lambda_{max}$ shifts to 295 m$\mu$ ($\epsilon^{1\%}$=79, methanol).)

(V) Infra-red spectrum: (See FIGURE 2 for spectrum in mineral oil—Nujol). The absorption peaks (W=weak, M=moderate, M–S=moderate to strong, S=strong, VS=very strong, sh=shoulder) are located at the following wavelengths:

| $\lambda_{max.}(\mu)$: | Peak strength |
|---|---|
| 2.89 | S |
| 5.73 | S |
| 6.12 | W |
| 6.35 | sh |
| 6.45 | S |
| 7.10 | sh |
| 7.30 | sh |
| 7.42 | S |
| 7.68–7.84 | S (broad) |
| 7.99 | S |
| 8.33 | S |
| 8.48–8.70 | sh |
| 8.84–9.17 | S (broad) |
| 9.57 | S (broad) |
| 10.00 | sh |
| 10.22–10.26 | S (doublet) |
| 10.55 | S |
| 10.91 | sh |
| 11.00 | M |
| 11.50–11.60 | M (broad) |
| 11.66 | sh |
| 11.90–12.00 | M (broad) |
| 12.25–12.35 | W (broad) |
| 12.70–12.85 | W (broad) |
| 13.00 | W |
| 13.52–13.60 | W (broad) |
| 13.85–13.90 | W (broad) |
| 14.42–14.58 | W (broad) |

(VI) Solubility:
  Very soluble in: chloroform, methylene chloride, acetone and methanol and 0.1 N sodium hydroxide.
  Sparingly soluble in ether.
  Insoluble in: petroleum ether, toluene, benzene, water 10% sodium bicarbonate (aqueous) and 10% sodium carbonate (aqueous).

(VII) Stability:
  The antibiotic is stable at 0° C. and in the dark.
  In methanol solvent containing a trace of pyridine, it is stable for at least two weeks.
  Rapid deactivation occurs at a pH below 5.5 whereas at pH above 7 and up to 12 the activity is retained for a few days.
  Upon treatment with 0.1 N methanolic HCl at room temperature for 16 hours the antibiotic activity is destroyed. Treatment of the acidic mixture with a stoichiometric amount of sodium bicarbonate (2% aqueous solution), followed by removal of the methanol by concentration in vacuo and extraction with chloroform yields a mixture of five component as determined by thin layer chromatography on silica gel using benzene acetone (75:25) as a solvent and sulfuric acid as a reagent spray. All components are less polar than everininomicin D.
  Upon treatment with 1.0 N NaOH at room temperature for 16 hours the activity of component D is essentially unchanged.

(VIII) Derivatives:
  (a) Acetate-prepared as in Example 6 M.P. 151–160° C., U.V. absorption maximum at 286 m$\mu$ ($\epsilon^{1\%}$=9.2). Rotation-$[\alpha]_D^{25}$=25.4° (1% in methanol). Analysis: C=53.08%, H=7.08%, N=0.77%. Infrared (Nujol) absorption bands at 2.85, 5.57, 5.71, 6.14, 6.45, 8.02, 8.38, 8.88, 9.17, 9.55$\mu$.

Everninomicin E

Component E, as isolated and purified, as described heretofore, is a nearly colorless, amorphous powder having the following physical and chemical properties:

(I) Melting point: 89–96° C.

(II) Analysis:
  (a) Quantitative
    C=65.17%
    H=7.54%
    N=1.31%
    O=24.25%
  (b) Qualitative
    (1) Ninhydrin test—negative
    (2) Elson-Morgan—positive
    (3) Alkaline $KM_nO_4$—positive
    (4) Anthrone—positive
    (5) 2,4-dinitrophenylhydrazine—positive
    (6) Ehrlich (diphenylamine)—negative
    (7) Triphenyltetrazolium—positive (III) Rotation $[\alpha]_D^{25}$=+36.7° (1% in dioxane).

(IV) Ultraviolet spectrum: $\lambda_{max}$ 240m$\mu$ (methanol), ($\epsilon^{1\%}$=232).

(V) Infrared Spectrum: (See FIGURE 3 for spectrum in mineral oil—(Nujol). The absorption peaks are located at the following wave-lengths with intensity indicated as before:

$\lambda_{max.}(\mu)$: Peak strength

| | |
|---|---|
| 2.94 | M–S |
| 5.68 | S |
| 5.76 | S |
| 5.83 | S |
| 6.0 | VS |
| 6.16 | M–S |
| 6.22 | M–S |
| 7.87 | VS |
| 8.31 | W |
| 8.55 | W |
| 8.96 | W |
| 9.33 | W |
| 9.55 | W |
| 9.77 | M–S |
| 6.50 | W |
| 10.50 | W |
| 10.90 | W |
| 11.26 | M–S |
| 11.42 | W |
| 12.22 | W |
| 12.62 | M–S |

(VI) Solubility:
Component E is soluble in:
chloroform, methylene, chloride, acetone, methanol and ether.
Partially soluble in benzene, toluene and hexane.
Insoluble in water.

Everninomicin F

Component F, isolated and purified as described heretofore, is an off-white amorphous powder having the following physical and chemical properties:
(I) Melting point: 91–98° C.
(II) Analysis:
  (a) Quantitative
    C=60.68%
    H=8.85%
    N=2.41%
    O=26.96%
    Cl=1.10%
  (b) Qualitative
    (1) Ninhydrin test—negative
    (2) Triphenyltetrazolium—positive
(III) Rotation: $[\alpha]_D^{25}$=24.3 (1% in dioxane).
(IV) Ultraviolet Spectrum: $\lambda_{max}$ 240 m$\mu$ (methanol) ($\epsilon^{1\%}$=206).
(V) Infrared Spectrum: The infrared spectrum was run on an evaporated film and showed absorption peaks located at the following wave lengths with intensity indicated as before. (See FIGURE 4 for spectrum from which the following absorption peaks are derived):

$\lambda (\mu)$: Peak strength

| | |
|---|---|
| 2.85 | M |
| 3.37–3.41 | S |
| 5.77 | S |
| 5.83 | sh |
| 5.90 | M–S |
| 6.17 | M–S |
| 6.83 | M |
| 7.22 | M |
| 7.58 | M |
| 7.80 | M |
| 7.97 | sh |
| 8.42 | M–S |
| 8.57 | M–S |
| 8.99 | M–S |
| 9.30 | M–S |
| 9.53 | M–S |
| 9.75 | M |
| 10.15 | M |
| 11.15 | W |
| 11.80 | W |
| 12.60 | W |

(VI) Solubility:
Everinomicin F is soluble in most organic solvents including: chloroform, methylene chloride, acetone methanol, ethanol, ether, benzene, toluene and hexane.
Insoluble in water.

BIOLOGICAL PROPERTIES OF ANTIBIOTICS PRODUCED BY THE FERMENTATION OF *M. CARBONACEA*

The antibiotics produced as described herein, particularly everninomicin components B, D and F exhibit a broad range of anti-microbial activity against gram-positive pathogenic microorganisms. Components B, D and F are of particular value in combatting infections produced by penicillin-resistant microorganisms such as certain strains of *Staphylococcus aureus* and are of value in combatting certain microorganisms which are susceptible to destruction by the penicillins. It is known that many disease manifestations are caused by gram-positive organisms (such as Streptococcus, Staphylococcus, Pneumococcus, and the like). These are properly controlled and treated by means of the action of the antibiotics described herein, principally everninomicin B, everninomicin D and everninomicin F. A particular manifestation is infectious bovine-mastitis which is generally caused by species of *Staphylococcus* (*aureus*) and *Streptococcus* (*agalactiae, dysgalactiae,* and *uberis*). These antibiotics effect esentially complete cure of the disease after a relatively brief regimen of administration. Further high potency and effect has been elicited against pathogenic avian strains of pleuropenumonia-like organisms and accordingly these antibiotics are of value to chicken breeders and egg farmers.

In addition to it activity against gram-positive microorganisms, everninomicin F, unlike the other antibiotics described herein, is also effective against a broad range of pathogenic microorganisms including species of the genus Escherichia, Salmonella, Proteus and Psuedomonas. It is well known that many serious disease syndromes including urinary tract infections and diarrheas are caused by gram-negative organisms. These syndromes, which are quite common in domestic animals such as cattle, horses, sheep, swine and household pets such as dogs and cats may be effectively treated and controlled by means of the action of everninomicin F which usually offers a prompt and complete cure.

The gram-positive only antibiotics produced herein by virtue of their antibacterial action against microorganisms such as *Staphylococcus aureaus, Bacillus subtilis* and the like are advantageously employed as laboratory reagents when attempting to determine the presence of gram-negative organisms. They may be used to inhibit overgrowth of such organisms in culture media, either alone or in combination with other antibacterial agents to reduce or eliminate the heavy overgrowth of gram-positive organisms permitting the determination of gram-negative organisms such as *Klebsiella penumoniae* or *Escherichia coli* in cultures obtained in diagonstic procedures. As such reagents they may be employed in solution such as in alcohol. Everninomicin F, by virtue of its activity against gram-positive and gram-negative microorganisms, may be used to supress bacterial growth in culture media permitting the determination of yeasts and molds in diagnostic cultures. In view of their action against gram-positive organisms, the antibiotics described herein may be used to "sterilize" equipment such as in operating rooms in hospital wards.

The comparative in vitro activities of everninomicin B (as produced in Example 10) everninomicin D (as produced in Example 5) and everninomicin F (as produced in Example 11) are set forth in Table IX below.

The invitro activity of everninomicin F against gram-negative microorganisms is shown in Table IX(A) below.

The susceptibility of the test microorganisms to the antibiotics was determined by standard tube dilution methods. In each instance, $10^{-5}$ dilutions of 24 hour broth cultures were employed as inoculum with the end points being taken after incubation for 24 hours at 37° C. in a Difco Penassay broth medium (Difco Labs, Detroit, Mich.). In the tables, the activity of the respective antibiotics is expressed in units per milliliter or micrograms per milliliter, a unit being as defined heretofore.

techniques. Upon subcutaneous injection, component F was found to produce a life-prolonging effect in mice infected with a lethal inoculum of Klebsiella pneumoniae and a protecting effect in mice infected with a lethal inoculum of Straphylococcus aureus.

The acute toxicity of everninomicin B and D in the standard test animal (mouse 18–20 g.) is as follows:

TABLE XI.—ACUTE TOXICITY IN MICE OF EVERNINOMICINS B AND D

| Mode of Administration | LD/50 (mg./kg.) | |
|---|---|---|
| | B | D |
| Subcutaneous | 2,500 | 1,000 |
| Intraperitoneal | 750 | 500 |

TABLE IX.—IN VITRO ANTIBIOTIC SPECTRUM OF EVERNINOMICIN COMPONENTS B, D AND F

| Test Microorganism | Minimal Inhibiting Concentration | | |
|---|---|---|---|
| | (Units/ml.) | (Units/ml.) | (µg./ml.) |
| Bacillus cereus QMCC B964 | 0.3 | 0.025 | |
| Bacillus megatherium ATCC 5773 | 1.2 | 0.15 | |
| Bacillus subtilis ATCC 6633 | 1.2 | 0.15 | 0.25 |
| Sarcina lutea ATCC 9341 | 1.2 | 0.3 | |
| Staphylococcus aureus ATCC 6538 | 0.15 | 0.025 | |
| Staphylococcus aureus ATCC 6538P | 0.15 | 0.025 | 0.25 |
| Staphylococcus aureus ATCC 12715 | 0.6 | 0.15 | |
| Staphylococcus aureus ATCC 9996 | 0.15 | 0.075 | |
| Staphylococcus aureus ATCC 1163 | 0.6 | 0.3 | |
| Staphylocccus aureus Gray | 0.3 | 0.025 | 0.25 |
| Staphylococcus auruse Smith | 0.6 | 0.15 | |
| Staphylococcus aureus DA 2027-2036 [1] | | Each 0.25 | |
| (10 clinical isolates resistant to penicillin, streptomycin, tetracycline and erythromycin): | | | |
| Diplococcus pneumoniae [2] DA 150 | | 0.25 | 0.25 |
| Streptococcus pyogenes [2] DA 21 | 0.15 | 0.0075 | 0.25 |
| Streptococcus hemolyticus | 0.1 | 0.01 | |
| Streptococcus faecalis ATCC 10541 | 0.3 | 0.025 | |

[1] DA refers to strain identity in private collection of Schering Corporation, Bloomfield, New Jersey.
[2] Brain-heart infusion broth plus 0.5% of human serum.

Table IX(A).—In vitro antibiotic spectrum, gram-negative) everninomicin F

| Test microorganism: | Minimal inhibiting concentration (µg./ml.) |
|---|---|
| Escherichia coli ATCC 10536 | 7.5 |
| Klebsiella pneumoniae DA 20 | 7.5 |
| Proteus vulgaris DA 121 | 15.0 |
| Pseudomonas aeruginosa ATCC 8689 | 15.0 |
| Salmonella schottmuelleri DA 10 | 7.5 |

The in vivo activity of everninomicin B and D has been elicited pharmacologycally in a standard test animal (mouse 18–20 g.) against certain pathogenic microorganisms. The standard test procedure employed is as follows. Thirty mice were infected with an inoculum of the particular pathogen adminstered by intraperitoneal injection. Twenty mice were then treated by subcutaneous injection of the antibiotic dissolved in ethanol (2 parts), Tween 80 (0.5 part), peanut oil (8.5 parts) and the injection administered in two equally divided daily dosage. Ten mice were maintained as controls, that is, untreated. All control animals died within 18 hours. The protecting dose relative to survival of 50% of the treated animals (PD/50) for 48 hours was evaluated to be as follows in conjunction with the particular pathogen.

TABLE X.—IN VIVO ACTIVITY OF EVERNINOMICIN COMPONENTS B AND D

| Pathogen | PD/50 (mg./kg.) | |
|---|---|---|
| | B | D |
| Streptococcus pyogenes | <1.3 | 3.75 |
| Staphylococcus aureus | 2.5 | 12.5 |
| Diplococcus pneumoniae | | 3.75 |

The in vivo activity of everninomicin F has also been confirmed in mice employing standard pharmacological The in vitro activity of everninomicin E against representative microorganisms is set forth in Table XII below.

TABLE XII.—IN VITRO ACTIVITY OF EVERNINOMICIN E

| Concentration Component E µg./ml. | Size of Zone of Inhibition mm. against | | |
|---|---|---|---|
| | S. aureus | S. fecalis | B. substilis |
| 1,000 | 20 | 19 | 24 |
| 100 | 15 | 13 | 19 |
| 10 | 8 | 9 | 15 |
| 1 | 0 | 0 | 8 |

It will be noted that the antibiotics as described above, with the exception of component E, are chlorine containing antibiotics. Fermentation of Micromonospora carbonacea in the chlorine containing media described heretofore permits the biosynthetic utilization of chlorine introduced into the fermentation media from such sources as the yeast extract, fish soulables and water employed in its preparation. From the foregoing, however, it will be obvious to one skilled in the art that modification of the halogen content of the fermentation medium can be effected with consequent modification of the halogen content of the antibiotics produced.

It will be obvious, for example, that deschloro derivatives corresponding to the chlorinated antibiotics described above can be prepared by fermenting Micromonospora carbonacea in fermentation medium as heretofore described wherein the chlorine content has been substantially reduced or eliminated. Chlorine can be removed from the medium by silver nitrate precipitation and/or by removal on anionic exchange resins. Reduction of chlorine content in the fermentation media can also be effected by the addition thereto of organic chlorination inhibitors such as mercaptobenzothiazole. Applicants consider the deschloro derivatives so produced to be the full equivalents of the antibiotics described above and to fall within the scope of this invention.

Further, it will be obvious to anyone skilled in the art that bromo derivatives corresponding to the chlorinated antibiotics described above can be prepared by fermenting *Micromonospora carbonacea* in a medium containing bromine. Such bromine containing medium is readily obtained by adding bromine containing compounds such as, for example, sodium bromide or potassium bromide to a medium dechlorinated as previously described. Applicants consider the bromo derivatives prepared by such fermentation also to be the full equivalents of the chlorinated antibiotics described herein and to fall within the scope of this invention.

We claim:

1. A method for producing everninomicin which comprises cultivating a microorganism selected from the group consisting of *Micromonospora carbonacea* var. *carbonacea* NRRL 2972 and *Micromonospora carbonacea* var. *aurantiaca* NRRL 2997 under submerged aerobic conditions in an aqueous nutrient medium containing an assimilable source of carbon and nitrogen until a composition of matter having substantially antibiotic activity is produced and recovering said antibiotic composition therefrom.

2. A method according to claim 1 wherein the organism in *Micromonospora carbonacea* var. *carbonacea* NRRL 2972.

3. A method according to claim 1 wherein the organism is *Micromonospora carbonacea* var. *aurantiaca* NRRL 2997.

4. A method for producing antibiotics everninomicin B, everninomicin D, everninomicin E and everninomicin F by the process of claim 1 in an aqueous chlorine containing nutrient medium under submerged aerobic conditions until a composition of matter having substantial antibiotic activity is produced and recovering said antibiotics therefrom.

5. A method according to claim 4 wherein after substantial antibiotic activity is produced, the mycelium is separated from the medium and the broth is extracted with an organic solvent from which the antibiotic compositons of matter are isolated.

6. A composition of matter, identified as antibiotic everninomicin B, effective in inhibiting the growth of gram-positive bacteria, said everninomicin B being an organic substance having the following elementary analysis: $C=51.02\%$, $H=6.68\%$, $N=1.23\%$, $$O=334.72\%$$

and $Cl=3.97\%$, that has a specific optical rotation as measured by the D line of sodium at 25° C. of $-25.5°$ in pyridine at 1% concentration, is insoluble in water, ether, and hexane, is slightly soluble in benzene and very soluble in halogenated hydrocarbons, acetone, methanol, ethanol, pyridine and dilute aqueous alkali; has an ultraviolet absorption maximum at 288 m$\mu$ with $\epsilon^{1\%}$ in methanol equal to about 12; has an infrared absorption when suspended in solid form in hydrocarbon oil substantially as shown in FIGURE 1; has a melting point of about 154–157° C.; and has an antibacterial spectrum including the bacteria enumerated in Table IX.

7. A composition of matter, identified as antibiotic everninomicin D, effective in inhibiting the growth of gram-positive bacteria, said everninomicin D being an organic substance having the following elementary analysis: $C=51.79\%$, $H=6.35\%$, $N=1.40\%$, $$O=36.35\%$$

and $Cl=3.98\%$ that has a specific optical rotation as measured by the D-line of sodium at 25° C. of $-37.7°$ in pyridine at 1% concentration and $-25.3°$ in methanol at 1% concentration; is soluble in halogenated hydrocarbons, acetone, methanol, and dilute aqueous alkali, is sparingly soluble in ether and insoluble in water, petroleum ether, toluene and benzene; has an ultraviolet absorption maximum at 295 m$\mu$ with $\epsilon^{1\%}$ in methanol equal to about 79; has an infrared absorption spectrum when suspended in solid form in hydrocarbon oil substantially as shown in FIGURE 2; has a melting point of about 160–161° C.; and has an antibacterial spectrum including the bacteria set forth in Table IX.

8. A composition of matter, identified as antibiotic everninomicin E, effective in inhibiting the growth of gram positive bacteria; said everninomicin E being an organic substance and characterized in having an infrared spectrum when suspended in solid form in hydrocarbon oil substantially as shown in FIGURE 3 and further characterized by the following parameters: Analysis: $C=65.17$, $H=7.54$, $N=1.31$, $O=24.23$; soluble in chloroform, methylene chloride, acetone, methanol and ether, sparingly soluble in hexane, benzene and toluene; insoluble in water, ultraviolet absorption maximum at 240 m$\mu$ with $\epsilon^{1\%}$ in methanol equal to about 232; $[\alpha]_D^{25}=+36.7$ (1% in dioxane); melting point 89–96° C.; qualitatively negative in the ninhydrin test, Ehrlich (diphenylamine test); qualitatively positive in the Elson-Morgan test; alkaline permanganate test; anthrone test, 2,4-dinitrophenylhydrazine test, and tetraphenyltetrazolium test.

9. A composition of matter, identied as antibiotic everninomicin F, effective in inhibiting the growth of gram-positive and gram-negative bacteria, said everninomicin F being an organic substance having the following elementary analysis; $C=60.68\%$, $H=8.85\%$, $N=2.41\%$, $O=26.96\%$ and $Cl=1.10\%$; that has a specific optical rotation as measured by the D-line of sodium at 25° C. of $-24.3$ in dioxane at 1% concentration; is soluble in organic solvents including chloroform, methylene chloride, acetone, ethanol, methanol, ether benzene, toluene and hexane and is insoluble in water; has an ultraviolet absorption maximum at 240 m$\mu$ with $\epsilon^{1\%}$ in methanol equal to about 206; has an infrared absorption spectrum as an evaporated film substantially as shown in FIGURE 4; has a melting point of about 91–98° C.; and has an antibacterial spectrum including the bacteria enumerated in Table IX and Table IX(A).

References Cited

Derwewt Farmdoc 15,634, Neth. Patent 6,408,506, published Jan. 25, 1965, pp. 339–375.

ALBERT T. MEYERS, Primary Examiner

JEROME D. GOLDBERG, Assistant Examiner

U.S. Cl. X.R.

195—80; 424—121, 122

PO-1050
(5/69)

UNITED STATES PATENT OFFICE
CERTIFICATE OF CORRECTION

Patent No. 3,499,078    Dated   March 3, 1970

Inventor(s) George M. Luedemann and Marvin J. Weinstein

It is certified that error appears in the above-identified patent and that said Letters Patent are hereby corrected as shown below:

Column 1, line 19, "beng" should read --being--. Column 1, line 42, "is wash" should read --in wash--. Column 1, line 55, "variable" should read --viable--. Column 2, line 8, "visible culture" should read --viable culture--. Column 2, line 43, "Coloney" should read --Colony--. Table I "Type A, 1%" should read --Type A*, 1%--. Column 6, line 66, "packed coil" should read --packed cell--. Columns 6 and 7, lines 75 and 1, "formentation" should read --fermentation--. Column 8, line 28, "and against" should read --and again--. Column 8, line 51, "toleuene" should read --Toluene--. Column 8, line 54 "Distiled water" should read --Distilled water--. Column 9, line 40, "dried plate, so" should read --dried plate, no--. Column 9, line 53, "refrigeratr" should read --refrigerator--. Column 9, line 66 "and $R_f$ value" should read --an $R_F$ value--. Column 10, line 52, "pattern, $R_f$" should read --pattern, $R_F$--. Column 10, line 57, "0 55 (trace)" should read --0.55 (trace)--. Column 11, line 4, "pattern, $R_f$" should read --pattern, $R_F$--. Column 11, line 34, "pattern; $R_f$" should read --pattern; $R_F$--. Column 11, line 45 "latter designate" should read --letter designate--. Column 12, line 52 "Park strength" should read --Peak strength--. Column 14, line 33, "five component" should read --five components--. Column 14, line 38, "everninomicin" should read --everninomicin--. Column 14, line 63 "0=24.25%" should read --0=24.23%--. Column 15, line 3 "$\lambda$ max ($\mu$)" should read --$\lambda(\mu)$--. Column 16, line 36 "esentially" should read --essentially--. Column 17, Table IX, line 11, "Staphylococcus auruse Smith" should read --Staphylococcus aureus Smith--. Column 17, line 52 "pharmacologycally" should read --pharmacologically--. Column 17, line 60 "daily dosage" should read --daily dosages--. Column 19, claim 1 "having substantially" should read --having substantial--. Column 19, claim 6 "0=334.72%" should read --0=34.72%--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents